(12) United States Patent
Nomoto

(10) Patent No.: US 10,191,359 B2
(45) Date of Patent: Jan. 29, 2019

(54) ILLUMINATION APPARATUS AND IMAGE DISPLAY APPARATUS USING THE ILLUMINATION APPARATUS

(71) Applicant: CANON KABUSHIKI KAISHA, Tokyo (JP)

(72) Inventor: Makoto Nomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/816,988

(22) Filed: Nov. 17, 2017

(65) Prior Publication Data

US 2018/0149953 A1    May 31, 2018

(30) Foreign Application Priority Data

Nov. 25, 2016   (JP) ................ 2016-228977

(51) Int. Cl.
| | |
|---|---|
| G03B 21/16 | (2006.01) |
| F21V 29/67 | (2015.01) |
| F21V 29/70 | (2015.01) |
| F21V 29/89 | (2015.01) |
| G03B 21/20 | (2006.01) |
| F21Y 115/30 | (2016.01) |

(52) U.S. Cl.
CPC ............ *G03B 21/16* (2013.01); *F21V 29/677* (2015.01); *F21V 29/70* (2015.01); *F21V 29/89* (2015.01); *G03B 21/204* (2013.01); *G03B 21/208* (2013.01); *G03B 21/2066* (2013.01); *F21Y 2115/30* (2016.08)

(58) Field of Classification Search
None
See application file for complete search history.

(56) References Cited

U.S. PATENT DOCUMENTS

2014/0240680 A1   8/2014   Nishimori
2017/0214892 A1   7/2017   Nagatani

FOREIGN PATENT DOCUMENTS

| JP | 2011-133789 A | 7/2011 |
| JP | 2011-197593 A | 10/2011 |
| JP | 2012-203350 A | 10/2012 |

*Primary Examiner* — Kristy A Haupt
(74) *Attorney, Agent, or Firm* — Canon USA, Inc., IP Division

(57) ABSTRACT

An illumination apparatus includes a solid state light source unit including a plurality of light emitting points that emits light and is arranged on a light emitting face, a plurality of optical elements configured to guide light emitted from the plurality of light emitting points to an illumination target face, a heat conduction member arranged in a space different from a space between the light emitting face of the solid state light source unit and the plurality of optical elements, configured to conduct heat from the solid state light source unit, and a cooling unit configured to supply a first fluid to the heat conduction member along a first flow path and supply a second fluid to the space between the light emitting face and the optical elements along a second flow path, wherein the second fluid is a fluid from which dust or dust and moisture is reduced.

19 Claims, 10 Drawing Sheets

ILLUMINATION APPARATUS AND IMAGE DISPLAY APPARATUS USING THE ILLUMINATION APPARATUS

BACKGROUND OF THE INVENTION

Field of the Invention

The present disclosure relates to an illumination apparatus using a plurality of solid state light sources and to an image display apparatus including the illumination apparatus.

Description of the Related Art

In recent years, in order to improve luminance of a projection image projected by a projection type image display apparatus, there has been a demand for increasing solid state light sources to be used in number. While luminance of a projected image is improved when solid state light sources to be used is increased in number, it is difficult to cool the solid state light sources because an amount of heat generated therefrom becomes greater.

For example, in a technique discussed in Japanese Patent Application Laid-Open No. 2011-133789, in order to improve an effect of cooling the solid state light sources, a heat sink is arranged on an opposite side of a light emitting side of the solid state light sources, and the heat sink is connected to the other heat sinks by a heat-transfer member.

However, in the technique described in Japanese Patent Application Laid-Open No. 2011-133789, the more the number of solid state light sources increases, the more the size of the heat sink as a cooling unit arranged on the opposite side of the light emitting side of the solid state light sources increases. Further, a sealed space is formed on the light emitting side of the solid state light sources so as to prevent dust in a periphery of the solid state light sources from adhering to optical components in a vicinity of the solid state light sources and causing lowering of a light amount. Accordingly, the size of the heat sink as the cooling unit is inconveniently further increased to improve cooling performance.

SUMMARY OF THE INVENTION

The present disclosure is directed to an illumination apparatus having solid state light sources, capable of cooling the solid state light sources while preventing dust from adhering to the solid state light sources and preventing a cooling unit from being increased in size at the same time.

According to an aspect of the present disclosure, an illumination apparatus includes a solid state light source unit including a plurality of light emitting points that emits light and is arranged on a light emitting face, a plurality of optical elements configured to guide light emitted from the plurality of light emitting points to an illumination target face, a heat conduction member arranged in a space different from a space between the light emitting face of the solid state light source unit and the plurality of optical elements, configured to conduct heat from the solid state light source unit, and a cooling unit configured to supply a first fluid to the heat conduction member along a first flow path and supply a second fluid to the space between the light emitting face and the optical elements along a second flow path, wherein the second fluid is a fluid from which dust or dust and moisture is reduced.

Further features of the present disclosure will become apparent from the following description of exemplary embodiments with reference to the attached drawings.

DESCRIPTION OF THE EMBODIMENTS

Figure 1:
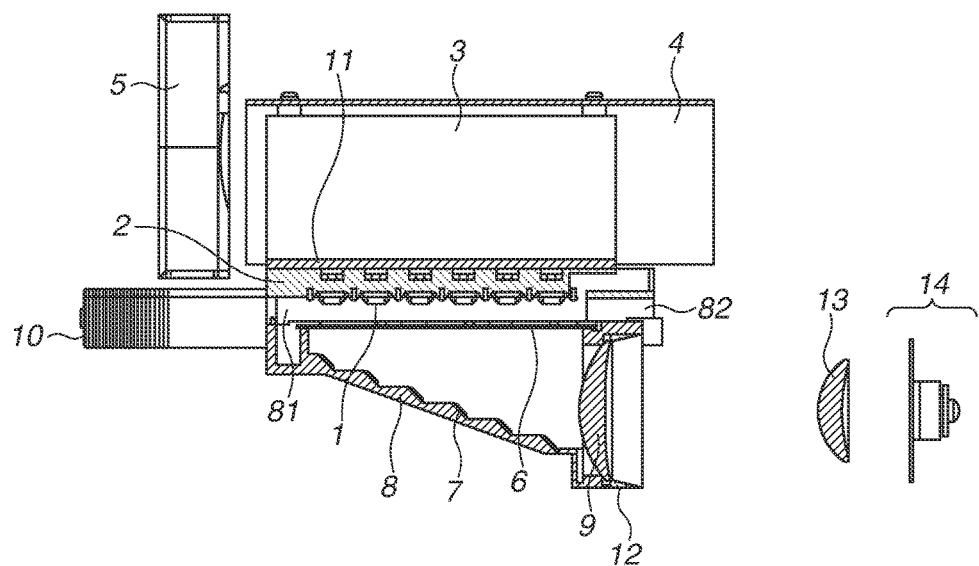
FIG. 1 is a diagram illustrating a cross-sectional view of a solid state light source unit of a first exemplary embodiment.

Hereinafter, exemplary embodiments of the present disclosure will be described with reference to the appended drawings. FIG. 1 is a cross-sectional diagram illustrating a configuration of a light source unit of a projector as a projection type image display apparatus according to an exemplary embodiment of the present disclosure.

Figure 2:
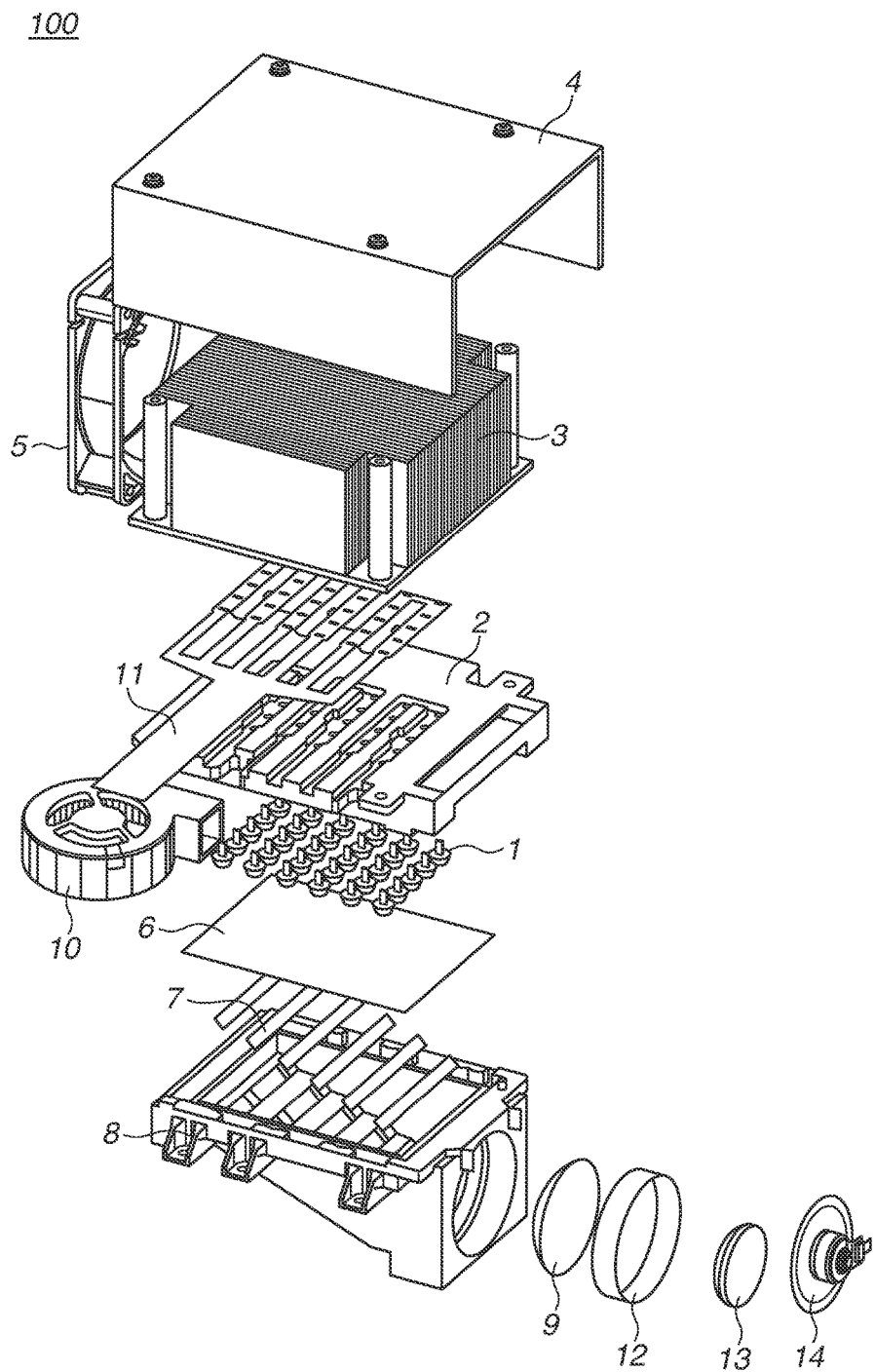
FIG. 2 is a diagram schematically illustrating a perspective view of the solid state light source unit of the first exemplary embodiment.

Hereinafter, a schematic configuration of a first exemplary embodiment of the present disclosure will be described with reference to FIGS. 1 and 2. FIG. 1 is a diagram illustrating a cross-sectional view of a solid state light source unit 100. FIG. 2 is a diagram schematically illustrating a perspective view of the solid state light source unit 100.

The solid state light source unit 100 will be described. The light source unit (the solid state light source unit) 100 includes a plurality of solid state light sources 1. The solid state light source unit 100 emits light, to an optical system arranged at a succeeding position, from a plurality of light emitting points arranged on substantially the same face (light emitting face), i.e., from a plurality of light emitting points arranged on a side of light emitting faces of the plurality of solid state light sources 1 included in the solid state light source unit 100.

A solid state light source base member 2 holds the solid state light sources 1. A cooling unit 3 is attached to the solid state light source base member 2. A heat conduction member (not illustrated) that conducts heat is arranged in a space between the solid state light source base member 2 and the cooling unit 3. A duct 4 serving as a flow path along which air as a fluid is supplied to the cooling unit 3 is held by the cooling unit 3, and a fan 5 that supplies air to the duct 4 is attached thereto. Laser diodes are used as the solid state light sources 1. And a heat sink made of copper that has high heat conductivity is used as the cooling unit 3. A transmission glass 6 that transmits light emitted from the solid state light sources 1 is arranged on a plane (position) facing the light emitting faces of the solid state light sources 1. The transmission glass 6 is an optical component arranged to separate a space on a side of the light emitting face, which is desired to be cooled more efficiently, from a space on a side of a reflection mirror 7 described below. Although it is desirable that the transmission glass 6 be a parallel plate, the transmission glass 6 may be an optical component having a wedge shape. The reflection mirror 7 is a reflection mirror (reflection mirror array) that includes a plurality of small-size mirrors, and functions as an optical component for reflecting light passing through the transmission glass 6 and reducing an aspect ratio of the light beam.

A collective lens 9 collects light reflected by the reflection mirror 7 and emits the collected light to the outside of the solid state light source unit (light source unit) 100. Further, an optical component retaining unit (retaining member) 8 retains the transmission glass 6, the reflection mirror 7, and the collective lens 9. The optical component retaining unit 8 includes an air introduction port for introducing the cooling air to flow in the light emitting direction of the solid state light sources 1, which is a direction in which light from the solid state light sources 1 is emitted via the collective lens 9 on a right side in FIG. 1, i.e., a direction in which light passing through a reflection mirror is emitted via the collective lens 9. The optical component retaining unit 8 further includes a fan 10 for sending air (filtered clean air) to the air introduction port 81. A unit including the fan 5 and the fan 10, which supplies a cooling fluid, is called as "cooling unit".

Subsequently, an assembly structure and an effect of the light source unit 100 will be described in detail with reference to FIGS. 1, 3, 4, and 5.

Figure 3:
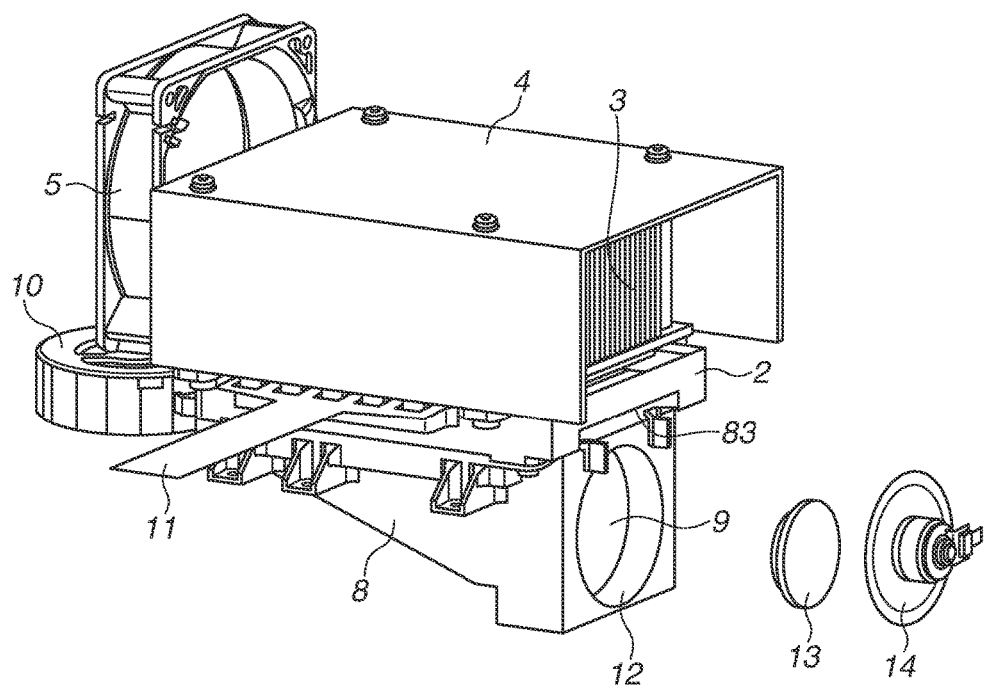
FIG. 3 is a diagram schematically illustrating an assembly structure of the solid state light source unit of the first exemplary embodiment.
Figure 4:
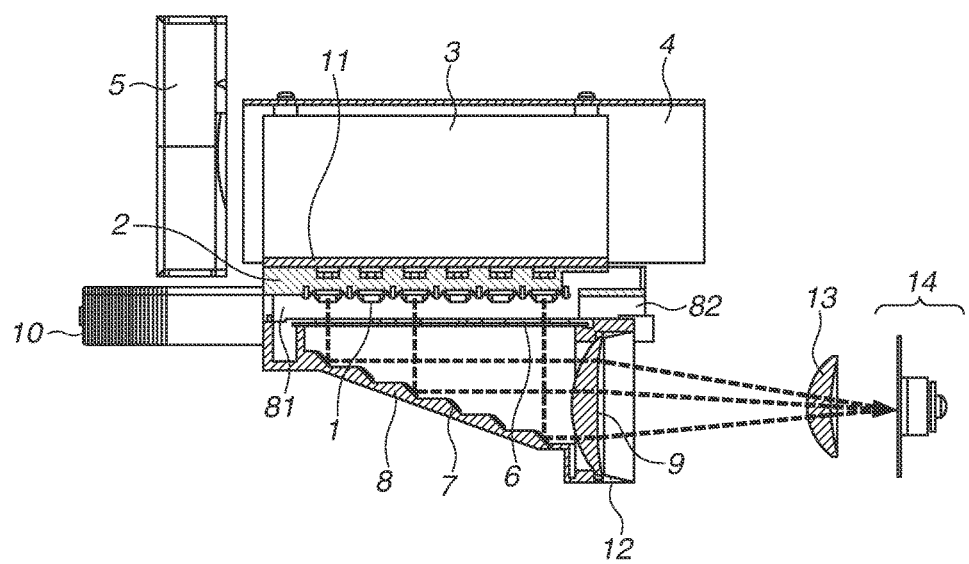
FIG. 4 is a diagram illustrating a light beam of the solid state light source unit of the first exemplary embodiment.
Figure 5:
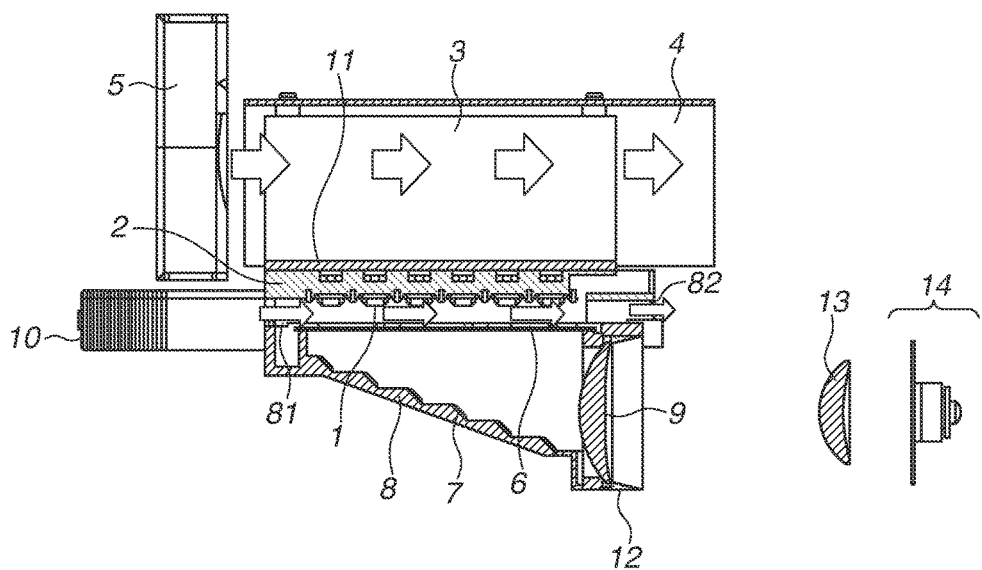
FIG. 5 is a diagram illustrating a cooling air flow of the solid state light source unit of the first exemplary embodiment.

FIG. 3 is a diagram schematically illustrating the assembly structure of the solid state light source unit 100. FIG. 4 is a diagram illustrating a light beam of the light source unit 100. FIG. 5 is a diagram illustrating a cooling air flow of the light source unit 100.

Each of the solid state light sources 1 is retained by the solid state light source base member 2 arranged on the opposite side of the light emitting side with a spring member (not illustrated) via the heat conduction member. In addition to the function of retaining the solid state light sources 1, the solid state light source base member 2 has a function of absorbing heat from the solid state light sources 1 via the heat conduction member to cool the solid state light sources 1.

The solid state light source base member 2 and the cooling unit 3 are fixed to each other with a fixing member such as a screw with the heat conduction member (not illustrated) therebetween. The cooling unit 3 is a heat sink cooled by a cooling air flow (cooling wind) supplied from the fan 5. The heat generated from the solid state light sources 1 is transmitted to the cooling unit 3 via the heat conduction member (not illustrated) and the solid state light source base member 2. Further, the cooling air flowing from the fan 5 is introduced to the duct 4 that forms a first flow path attached to the solid state light source base member 2 or the cooling unit 3, so as to be supplied to the cooling unit 3. As a result, the solid state light sources 1 can be cooled by the cooling air (wind) flowing from the fan 5.

In the present exemplary embodiment, although a heat sink is used as the cooling unit 3, a jacket unit that absorbs heat from a joint portion of heat pipes or a heat source of a liquid-cooled system, or a contact portion of a high-heat conduction member is also included in the scope of the present disclosure. Similarly, although the fan 5 is used as a cooling air generation unit, a pump unit of the liquid-cooled system is also included in the scope of the present disclosure.

The solid state light sources 1 include electrodes provided on the opposite side of the light emitting side, so as to emit light when an electric current is applied to a substrate 11 attached to the electrodes of the solid state light sources 1 from a power source unit included in a housing (not illustrated). The transmission glass 6 is tightly fixed to the optical component retaining unit 8 with a spring member (not illustrated) at a position facing the light emitting faces of the solid state light sources 1, in a vicinity of the solid state light sources 1. With this configuration, a second flow path for introducing the air from the fan 10 is formed by the solid state light sources 1, the solid state light source base member 2, the transmission glass 6, and the optical component retaining unit 8. In the present exemplary embodiment, although a flat plate is used as the transmission glass 6, a transmission glass which includes a curvature surface having an optical power for decentering the light beam from the solid state light sources 1 in parallel is also included in the scope of the present disclosure.

The reflection mirror 7 is arranged in correspondence with the solid state light sources 1 arranged in a strip state, and adhered and fixed to the optical component retaining unit 8. The collective lens 9 is also retained by the optical component retaining unit 8 with a holding member 12. Light emitted from the solid state light sources 1 passes through the transmission glass 6 and reflects on the reflection mirror 7. The reflected light passes through the collective lens 9, so as to be emitted from the light source unit 100. A space created by the transmission glass 6, the collective lens 9, and the optical component retaining unit 8 becomes a sealed space, and an amount of dust within the space is brought into a state where dust of a certain density level or a certain size or more is eliminated. With this configuration, it is possible to suppress deterioration of the optical components caused by dust collecting property of the solid state light sources 1. The reflection mirror 7 changes the reflection angles of the light beams from the solid state light sources 1 in a row unit, and reduces an aspect ratio of the light source associated with the arrangement of the plurality of solid state light sources 1. With this configuration, a size of the collective lens 9 as a succeeding stage can be reduced, and thus the light source unit 100 can be miniaturized. Although the strip-shaped reflection mirror 7 is used in the present exemplary embodiment, a polygonal-shaped mirror capable of adjusting an angle or a reflecting prism is also included in the scope of the present disclosure.

As illustrated in FIGS. 3 and 5, cooling air supplied from the fan 10 flows into the second flow path formed by the solid state light sources 1, the solid state light source base member 2, the transmission glass 6, and the optical component retaining unit 8, so as to flow out from an outlet port 82 via the air introduction port 81 provided on the optical component retaining unit 8. At this time, the cooling air cools the solid state light sources 1 while passing through the light emitting side of the solid state light sources 1. Because the transmission glass 6 is arranged in the vicinity of the solid state light sources 1, a cross-sectional area inside the second flow path (i.e., a cross-sectional area orthogonal to a direction in which the fluid flows) is reduced. Consequently, a speed of the cooling air is increased, and the cooling performance can be improved. Further, clean air (clean dry air) is used as the cooling air supplied from the fan 10. The clean air refers to the air that has passed through a filter for eliminating dust of a certain density level or a certain size or more. In other words, the clean air refers to the air from which dust having a certain size or more is eliminated, having a density level of dust less than a certain value. With this configuration, adhesion of dust with respect to the surfaces of the solid state light sources 1 or the surface of the transmission glass 6 facing the solid state light sources 1 is suppressed, and a capacity of cooling the solid state light sources 1 can be improved. Accordingly, by providing the second flow path, the cooling performance of the cooling unit 3 can be improved, and a size and a weight of the cooling unit 3 can be reduced.

The transmission glass 6 and the collective lens 9 serving as optical components as well as sealing members are arranged in a space between the solid state light sources and a fluorescent unit 14 that emits light of a predetermined wavelength by being irradiated with light emitted from the solid state light sources 1 acting as excitation light. With this configuration, the number of components of the light source unit 100 can be reduced as much as possible, and adhesion of dust with respect to the optical components can be suppressed. Further, the fluorescent unit 14 is cooled with cooling wind of clean air. Alternatively, the fluorescent unit 14 may be placed in a sealed space created by the sealing members, so that the fluorescent unit 14 can be cooled when the sealing members are cooled.

In the present exemplary embodiment, although the fan 5 serving as a cooling air flow generation unit for supplying a fluid to the first flow path and the fan 10 serving as a cooling air flow generation unit for supplying a fluid to the second flow path are arranged separately, only the fan 5 may be arranged. In this case, the first flow path and the second flow path can be cooled with a single fan by using the clean air, so that the solid state light source unit 100 can be miniaturized further. In addition, in a case where the fan 5 and the fan 10 are separately used as cooling fans, using a fan having a static pressure greater than that of the fan 5 as the fan 10 that introduces the air into the second flow path may be also useful to improve the cooling performance.

Figure 6:
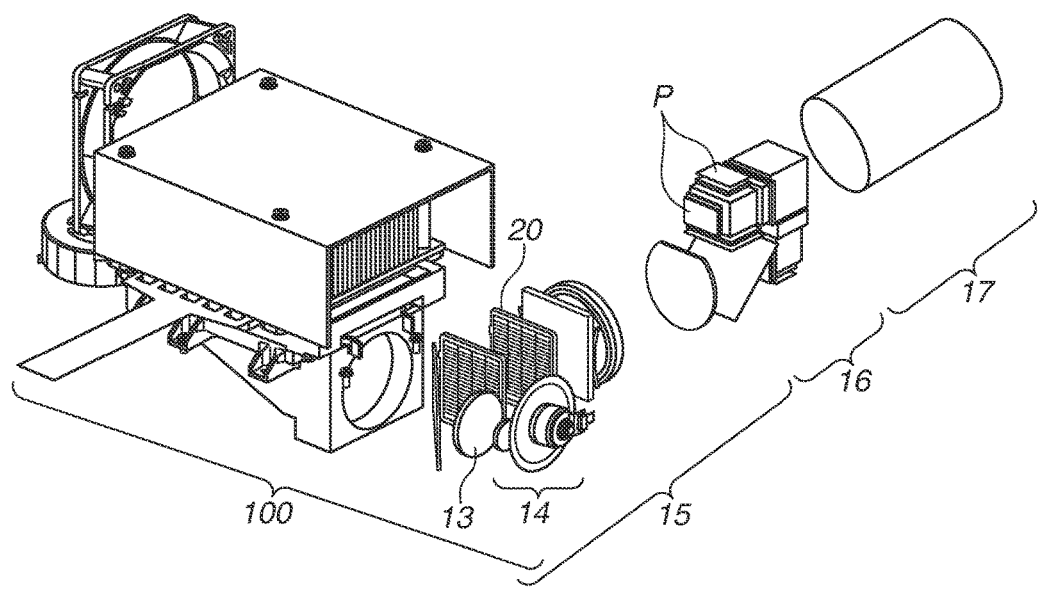
FIG. 6 is a diagram schematically illustrating an image display apparatus (image projection apparatus) of the first, a second, and a third exemplary embodiments.

Next, a configuration of an image display apparatus (image projection apparatus) of the present exemplary embodiment will be described with reference to an optical configuration schematic diagram illustrated in FIG. 6.

A configuration of the light source unit 100 is similar to the configuration described above. In other words, the light source unit 100 emits blue light (excitation light) from a light source and yellow light generated by a fluorescent unit 14 (i.e., a wheel provided with a fluorescent body) that converts a part of the blue light into the yellow light. Herein, although the blue light from the light source and the yellow light from the fluorescent body constitute white light, an exemplary embodiment is not limited thereto, and a light source of blue light or red light may be provided separately when the amounts of light of respective colors are not balanced.

An illumination optical system (illumination apparatus) 15 illuminates three image display elements P of respective colors of red, green, and blue with the light of three colors (i.e., white light) emitted from the light source unit 100. In addition, the illumination optical system (illumination apparatus) 15 is an optical system (apparatus) which illuminates the image display elements P by using light emitted from the light source unit 100. In other words, the illumination optical system 15 includes all of the optical elements arranged on a light path extending from the solid state light sources 1 to the image display elements P. The light beam emitted from the illumination optical system (illumination apparatus) 15 is separated into light of respective colors by a color separation/composition system 16 to enter the image display elements P of corresponding colors, so as to composite image light of respective colors when emitted from the image display elements P of respective colors. Composite image light composed of respective colors of image light passing through a projection lens 17 is projected on a projection plane such as a screen. Herein, the illumination optical system (illumination apparatus) 15 is a system (i.e., apparatus) for illuminating the image display elements P, which takes the image display elements P as illumination target faces. Accordingly, this illumination optical system (illumination apparatus) 15 may be considered as a system that includes a part of the color separation/composition system 16 (i.e., constituent elements arranged on a side of the light source, preceding to the image display elements P) and all or at least a part of the light source unit 100.

Hereinafter, a configuration and an effect of a light source unit according to a second exemplary embodiment will be described with reference to FIGS. 6, 7, and 8. The present exemplary embodiment is mainly different from the first exemplary embodiment in that a light source unit sealing member 18 for sealing a space including light emitting faces of the solid state light sources 1 is arranged on the light source unit. The light source unit sealing member 18 may have a function of sealing a side of the light emitting faces (faces on a light emitting side) of the solid state light sources 1. Herein, the light source unit sealing member 18 is configured to seal off the light emitting faces of the solid state light sources 1, the reflection mirror (reflection mirror array) 7, and the collective lens 9 (and a collective lens 13) from the outer space. More specifically, the light source unit sealing member 18 seals off the solid state light sources 1 and a flow path of the cooling air (cooling air flow) flowing and cooling the solid state light sources 1 from the outer space. Particularly, the light source unit according to the present exemplary embodiment is characterized in that the solid state light sources 1 and the flow path of the cooling air (cooling air flow) flowing and cooling the solid state light sources 1 are sealed off from the fluorescent unit 14 including a fluorescent body itself and a driving shaft or a motor for rotating the fluorescent body.

Figure 7:
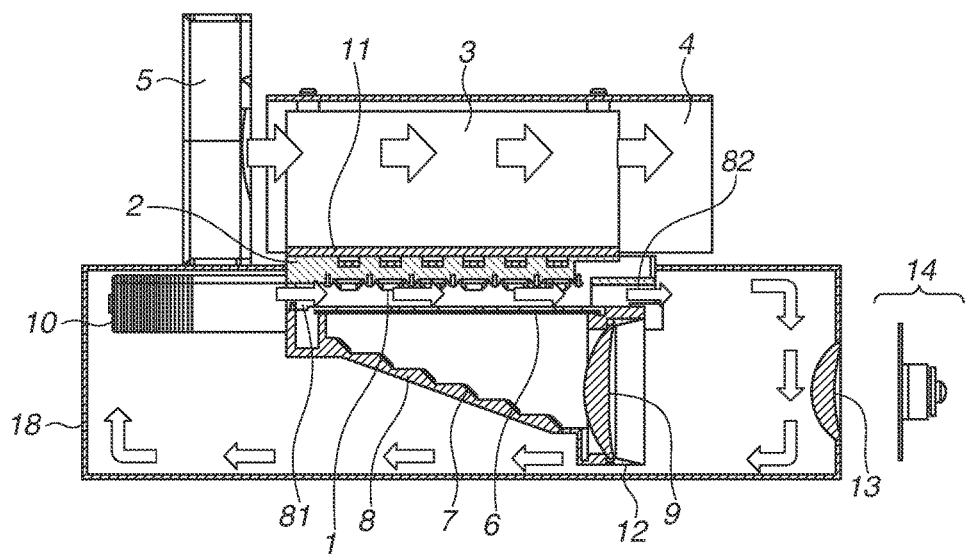
FIG. 7 is a diagram illustrating a cross-sectional view of a solid state light source unit of the second exemplary embodiment.
Figure 8:
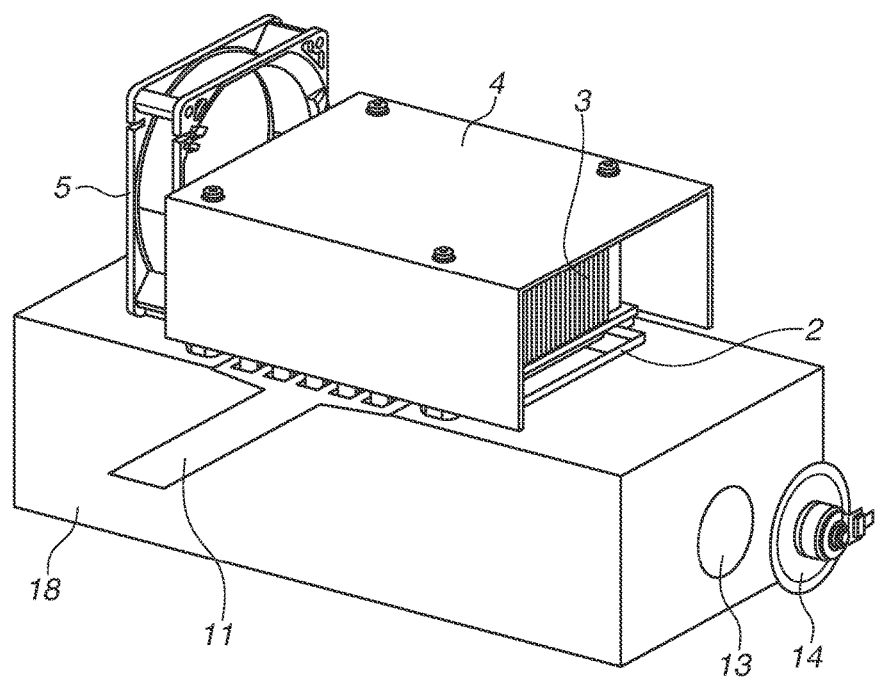
FIG. 8 is a diagram schematically illustrating a perspective view of the solid state light source unit of the second exemplary embodiment.

FIG. 7 is a diagram illustrating a cross-sectional view of a light source unit (solid state light source unit) 200 and a flow of cooling air, and FIG. 8 is a schematic diagram illustrating a perspective view of the light source unit 200. A configuration of the light source unit 200 which is almost similar to the configuration described in the first exemplary embodiment will not be described in particular, and the same reference numerals are applied to the elements common to those of the first exemplary embodiment.

In FIG. 7, the optical component retaining unit 8 includes the air introduction port 81 for introducing air in the light emitting direction of the solid state light sources (i.e., a direction of the collective lens 13 or the fluorescent body, or a direction of image display elements P such as a liquid crystal panel or a digital micromirror device (DMD)). Through this air introduction port 81, the fan 10 sends air to a space on a side of the light emitting faces of the solid state light sources 1, i.e., a space covered by the light emitting faces of the solid state light sources 1, the transmission glass 6 arranged at a position facing the light emitting faces, and a member that covers the side faces of both of the light emitting faces and the transmission glass 6.

It is desirable that the air to be sent to the space on a side of the light emitting faces of the solid state light sources 1 by the fan 10 be nitrogen or inert gas from which dust of a certain density level or a certain size or more is eliminated. In other words, it is desirable that clean and dry nitrogen which does not contain dust, moisture, or another gas be supplied from the fan 10 to a space between the light emitting face and the face of the transmission glass 6, so that the light emitting faces of the solid state light sources 1 are blown thereby.

The light source unit sealing member 18 is attached to the solid state light source base member 2, and creates a sealed space with a collective lens 13 as a part of a collective lens group including the collective lens 9. The sealed space created by the light source unit sealing member 18 contains the solid state light sources 1, the optical component retaining unit 8, the transmission glass 6, the reflection mirror 7, and the collective lens 9. In other words, this sealed space does not include a fluorescent unit (i.e., a fluorescent body for executing wavelength conversion), a disk-shaped (wheel-shaped) member on which the fluorescent body is arranged, or a mechanism (e.g., a shaft bearing or a motor) which rotates the disc-shaped member. Because the shaft bearing or the motor of the mechanism that rotates the disc-shaped member is not arranged inside the sealed space (i.e., by arranging the fluorescent unit outside the sealed space), a fluid inside the sealed space can be maintained in a clean state where only a little dust or moisture is contained.

Further, the sealed space created by the light source unit sealing member 18 is filled with nitrogen from which dust of a certain density level or a certain size or more is eliminated. Although nitrogen has been used in the present exemplary embodiment, using a space having low air capacity or low atmospheric pressure is also included in the scope of the present disclosure.

By using the configuration described in the present exemplary embodiment, adhesion of dust inside the sealed space can be suppressed, and the light emitting side of the solid state light sources 1 can be cooled because a flow is generated in the second flow path within the sealed space. Further, the light source unit sealing member 18 is a metallic member having high heat conductivity. Accordingly, by using nitrogen or a space having low atmospheric pressure, temperature within the sealing space can be further lowered and the cooling performance thereof can be improved further. Consequently, the cooling performance of the cooling unit 3 can be improved, and a size and a weight of the cooling unit 3 can be reduced.

In the present exemplary embodiment, a space (sealed space) created by the light source unit sealing member 18 is substantially isolated (or sealed off) from the outer space, and the space is filled with nitrogen or inert gas. Further, in order to eliminate dust or moisture from the nitrogen or the inert gas flowing inside the sealed space, a filter may preferably be arranged on the downstream side of the fan that supplies a fluid, or may be arranged at a position between the fan and the light emitting face where the air introduction port 81 is arranged. As described above, because the nitrogen or the inert gas from which dust or moisture is reduced by the filter can be circulated within the sealed space, the light emitting faces can be cooled without being contaminated.

In addition, by arranging a cooling air inlet port and an outlet port in a space (sealed space) created by the light source unit sealing member 18, clean dry air that has passed through a filter may be supplied or discharged via the inlet port or the outlet port. In other words, the same fluid (i.e., clean dry air) may be supplied to the inside and the outside (e.g., cooling unit 3) of the sealed space. Naturally, nitrogen may be supplied to the inside and the outside of the sealed space.

Hereinafter, a configuration and an effect of a light source unit according to a third exemplary embodiment of the present disclosure will be described with reference to FIGS. 6, 9, and 10. The present exemplary embodiment is mainly different from the second exemplary embodiment in that a light source unit sealing member 19 for sealing a space including light emitting faces of the solid state light sources 1 is arranged on the light source unit. Herein, the light source unit sealing member 19 is configured to seal off the light emitting faces of the solid state light sources 1, the reflection mirror (reflection mirror array) 7, the collective lens 9, and the fluorescent unit 14 from the outer space. More specifically, the light source unit sealing member 19 seals off the solid state light sources 1 and a flow path of the cooling air (cooling air flow) flowing and cooling the solid state light sources 1 from the outer space. Particularly, the light source unit according to the present exemplary embodiment is characterized in that the solid state light sources 1, the flow path of the cooling air (cooling air flow) flowing and cooling the solid state light sources 1, and the fluorescent unit 14 including a fluorescent body itself and a driving shaft or a motor for rotating the fluorescent body are sealed off from the outer space.

Figure 9:
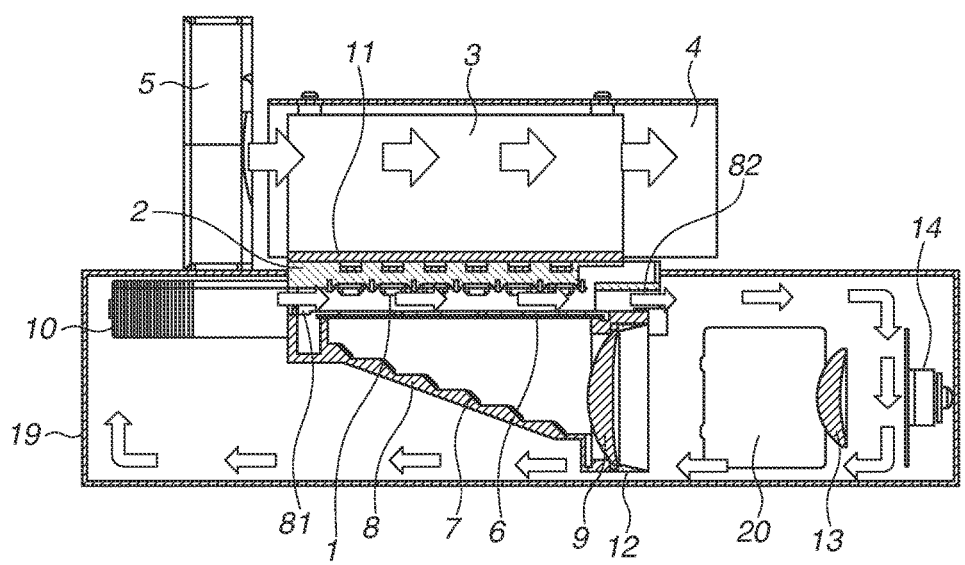
FIG. 9 is a diagram illustrating a cross-sectional view of a solid state light source unit of the third exemplary embodiment.
Figure 10:
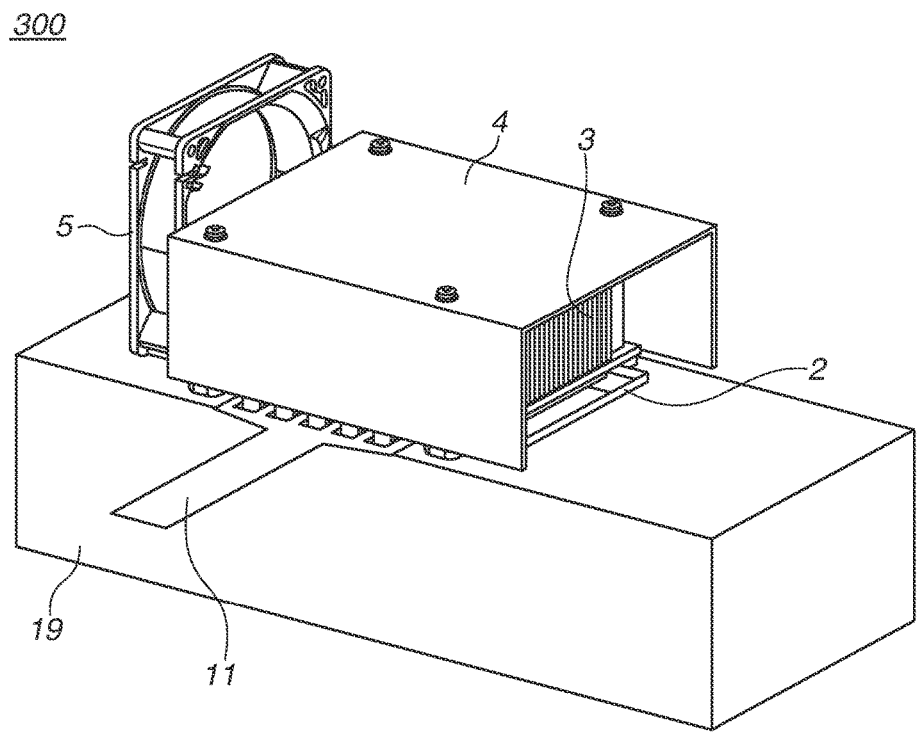
FIG. 10 is a diagram schematically illustrating a perspective view of the solid state light source unit of the third exemplary embodiment.

FIG. 9 is a diagram illustrating a cross-sectional view of a light source unit (solid state light source unit) 300 and a flow of cooling air, and FIG. 10 is a diagram schematically illustrating a perspective view of the light source unit 300. A configuration of the light source unit 300 which is almost similar to the configuration described in the first or the second exemplary embodiment will not be described in particular, and the same reference numerals are applied to the elements common to those of the first or the second exemplary embodiment.

The light source unit sealing member 19 is attached to the solid state light source base member 2, and creates a sealed space with an optical component 20 as a part of the illumination optical system 15. The sealed space created by the light source unit sealing member 19 contains the solid state light sources 1, the optical component retaining unit 8, the transmission glass 6, the reflection mirror 7, the collective lens 9, and the fluorescent unit 14.

Further, the sealed space created by the light source unit sealing member 19 is filled with nitrogen from which dust of a certain density level or a certain size or more is eliminated. Although nitrogen has been used in the present exemplary embodiment, using a space having low air capacity or low atmospheric pressure is also included in the scope of the present disclosure.

By using the configuration described in the present exemplary embodiment, adhesion of dust inside the sealed space can be suppressed, and the light emitting side of the solid state light sources 1 can be cooled because a flow is generated in the second flow path within the sealed space. Further, the light source unit sealing member 19 is a metallic member having high heat conductivity. Therefore, temperature within the sealing space can be further lowered by using nitrogen or a space having low atmospheric pressure, and thus the cooling performance thereof can be improved further. In addition, the fluorescent unit 14 is also arranged inside the sealed space, so that the fluorescent unit 14 can be cooled by using the cooling air from the fan 10. Therefore, the cooling performance of the cooling unit 3 can be improved, and a size and a weight of the cooling unit 3 can be reduced, and thus the solid state light source unit 300 can be miniaturized.

While the preferred exemplary embodiments of the present disclosure have been described, the present disclosure is not limited to the above-described exemplary embodiments, and many variations and modifications are possible within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-228977, filed Nov. 25, 2016, which is hereby incorporated by reference herein in its entirety.

What is claimed is:

1. An illumination apparatus comprising:
a solid state light source unit including a plurality of light emitting points that emits light and is arranged on a light emitting face;
a plurality of optical elements configured to guide light emitted from the plurality of light emitting points to an illumination target face;
a heat conduction member arranged in a space different from a space between the light emitting face of the solid state light source unit and the plurality of optical elements, configured to conduct heat from the solid state light source unit; and
a cooling unit configured to supply a first fluid to the heat conduction member along a first flow path and supply a second fluid to the space between the light emitting face and the optical elements along a second flow path,
wherein the second fluid is a fluid from which dust or dust and moisture is reduced.

2. The illumination apparatus according to claim 1, wherein the second fluid is a fluid from which dust or dust and moisture is reduced when the fluid passes through a filter.

3. The illumination apparatus according to claim 1, wherein the cooling unit includes:
a first fan configured to supply the first fluid to the heat conduction member along the first flow path; and
a second fan configured to supply the second fluid to the space between the light emitting face and the optical elements.

4. The illumination apparatus according to claim 3, wherein the second fan and the second flow path are sealed off from an outer space.

5. The illumination apparatus according to claim 4, further comprising a filter configured to reduce dust or moisture included in the second fluid flowing along the second flow path,
wherein the filter is arranged inside a sealed space including the second flow path.

6. The illumination apparatus according to claim 4, wherein the plurality of optical elements includes a first optical element, a mirror array, and a collective lens arranged from a side of the light emitting face, and
wherein a sealed space including the second flow path is a space that includes the first optical element, the mirror array, and the collective lens.

7. The illumination apparatus according to claim 6, wherein a fluorescent body that converts light emitted from the solid state light source unit into light of another wavelength is arranged on the illumination target face illuminated by the illumination apparatus, and
wherein the sealed space is a space that includes the fluorescent body.

8. The illumination apparatus according to claim 6, wherein a fluorescent body that converts light emitted from the solid state light source unit into light of another wavelength is arranged on the illumination target face illuminated by the illumination apparatus, and
wherein the fluorescent body is arranged outside the sealed space.

9. The illumination apparatus according to claim 3, further comprising a filter configured to reduce dust or dust and moisture included in the second fluid flowing along the second flow path,
wherein the filter is arranged at a position between the second fan and the light emitting face.

10. The illumination apparatus according to claim 3, wherein the second fan includes a filter configured to reduce dust or moisture included in the second fluid flowing along the second flow path.

11. The illumination apparatus according to claim 3, wherein a static pressure of the second fan is greater than a static pressure of the first fan.

12. The illumination apparatus according to claim 1, wherein the second fluid is inert gas from which dust or dust and moisture is reduced.

13. The illumination apparatus according to claim 1, wherein the first fluid is a fluid from which dust or dust and moisture is reduced, or inert gas from which dust or dust and moisture is reduced.

14. The illumination apparatus according to claim 1, wherein the first fluid and the second fluid are the same fluid from which dust or dust and moisture is reduced.

15. The illumination apparatus according to claim 1, wherein, when an optical element, from among the plurality of optical elements, that is closest to the light emitting face on a light path of light emitted from the plurality of light emitting points is specified as a first optical element, the cooling unit supplies the fluid to a space between the light emitting face and the first optical element.

16. The illumination apparatus according to claim 15, wherein the first optical element is a plate.

17. The illumination apparatus according to claim 15, wherein the plurality of optical elements includes a mirror array, and
wherein a plurality of mirrors that reflects respective light beams from the plurality of light emitting points is arranged at a succeeding position of the first optical element.

18. The illumination apparatus according to claim 1, wherein a cross-sectional area of the second flow path that is orthogonal to a direction in which the second fluid flows is smaller than a cross-sectional area of the first flow path that is orthogonal to a direction in which the first fluid flows.

19. An image display apparatus comprising:
an image display element; and
an illumination apparatus,
wherein the illumination apparatus includes:
a solid state light source unit including a plurality of light emitting points that emits light and is arranged on a light emitting face;
a plurality of optical elements configured to guide light emitted from the plurality of light emitting points to an illumination target face;

a heat conduction member arranged in a space different from a space between the light emitting face of the solid state light source unit and the plurality of optical elements, configured to conduct heat from the solid state light source unit; and
a cooling unit configured to supply a first fluid to the heat conduction member along a first flow path and supply a second fluid to the space between the light emitting face and the optical elements along a second flow path, and
wherein the second fluid is a fluid from which dust or dust and moisture is reduced.

* * * * *